(12) United States Patent
MacInnis

(10) Patent No.: US 9,402,098 B2
(45) Date of Patent: *Jul. 26, 2016

(54) FAST CHANNEL CHANGE

(71) Applicant: Broadcom Corporation, Irvine, CA (US)

(72) Inventor: Alexander Garland MacInnis, Los Altos, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,871

(22) Filed: Feb. 25, 2014

(65) Prior Publication Data

US 2014/0173676 A1 Jun. 19, 2014

Related U.S. Application Data

(63) Continuation of application No. 10/926,374, filed on Aug. 25, 2004, now Pat. No. 8,683,535.

(60) Provisional application No. 60/556,667, filed on Mar. 26, 2004.

(51) Int. Cl.
*H04N 7/173* (2011.01)
*G06F 11/00* (2006.01)
(Continued)

(52) U.S. Cl.
CPC ...... *H04N 21/4384* (2013.01); *H04N 21/23406* (2013.01); *H04N 21/23608* (2013.01);
(Continued)

(58) Field of Classification Search
CPC ............... H04N 21/23805; H04N 21/2401; H04N 21/2402; H04N 21/4384; H04N 21/44004; H04N 21/242
See application file for complete search history.

(56) References Cited

U.S. PATENT DOCUMENTS 5,706,281 A 1/1998 Hashimoto et al.
5,793,927 A 8/1998 Lane
(Continued)

FOREIGN PATENT DOCUMENTS

EP 1271953 1/2003
EP 1294193 3/2003

OTHER PUBLICATIONS

Longfei et al., "Implementation of a New MPEG-2 Transport Stream Processor for Digital Television Broadcasting", IEEE Transactions on Broadcasting, vol. 48, No. 4, Dec. 2002.*
(Continued)

*Primary Examiner* — Nathan Flynn
*Assistant Examiner* — James R Marandi
(74) *Attorney, Agent, or Firm* — Foley & Lardner LLP; Joseph N. Ziebert; Helen H. Zhang

(57) ABSTRACT

A request for a unit of video information is received from a remote video receiver. An initial transmission rate for the unit of video information is determined based at least in part on a decoder model and a typical steady-state transmission rate for the unit of video information. The initial transmission rate is faster than the typical steady-state transmission rate. For a first time period after receiving the request, a first portion of the unit of video information is transmitted to the remote video receiver at the initial transmission rate. The first time period, the initial transmission rate, or both are determined so as not to overflow an input buffer that is based at least in part on the decoder model. For a second time period after the first time period, a second portion of the unit of video information is transmitted to the remote video receiver at the typical steady-state transmission rate.

20 Claims, 3 Drawing Sheets

(51) Int. Cl.
*H04N 21/438* (2011.01)
*H04N 21/234* (2011.01)
*H04N 21/236* (2011.01)
*H04N 21/238* (2011.01)
*H04N 21/24* (2011.01)
*H04N 21/242* (2011.01)
*H04N 21/44* (2011.01)
*H04N 21/472* (2011.01)
*H04N 21/658* (2011.01)
*H04N 21/845* (2011.01)

(52) U.S. Cl.
CPC ..... *H04N21/23805* (2013.01); *H04N 21/2401* (2013.01); *H04N 21/2402* (2013.01); *H04N 21/242* (2013.01); *H04N 21/4383* (2013.01); *H04N 21/44004* (2013.01); *H04N 21/472* (2013.01); *H04N 21/6581* (2013.01); *H04N 21/8456* (2013.01)

(56) References Cited

U.S. PATENT DOCUMENTS

| | | | | |
|---|---|---|---|---|
| 6,397,251 | B1* | 5/2002 | Graf | 709/225 |
| 6,637,031 | B1 | 10/2003 | Chou | |
| 2003/0103243 | A1 | 6/2003 | Watanabe et al. | |
| 2004/0153951 | A1 | 8/2004 | Walker et al. | |
| 2004/0190606 | A1* | 9/2004 | Deshpande | 375/240.01 |
| 2005/0100100 | A1* | 5/2005 | Unger | H04N 21/2343 375/240.27 |
| 2005/0169192 | A1 | 8/2005 | Park et al. | |
| 2005/0198681 | A1 | 9/2005 | Park | |
| 2005/0216948 | A1 | 9/2005 | MacInnis | |

OTHER PUBLICATIONS

David K. Fibush, "Timing and Synchronization Using MPEG-2 Transport Streams", SMPTE Journal, Jul. 1996.*
H. Blakrishnan et. al., "An Integrated Congestion Management Architecture for Internet Hosts", Proc. of the Conference on Applications, Technologies, Architecture, and Protocols for Computer Communication, ACM, 1999; pp. 175-187.
Petit et al, "Bandwidth Resource Optimization in Video-on-Demand Network Architectures", Community Networking Integrated Multimedia Services to the Home, 1994, Proceedings of the 1st International Workshop in San Francisco, CA, USA. Jul. 13-14, 1994, New York, NY, USA, IEEE, Jul. 13, 1994, pp. 91-97, XP010124402, ISBN: 0-7803-2076-X.
Summons to attend oral proceedings pursuant to Rule 115(1) EPC related to European Patent Application No. 05002956.0 mailed Jun. 29, 2015.
Annex D—Systems timing model and application "Information Technology—Generic Coding of Moving Pictures and Associated Audio Information: Systems" Apr. 15, 1996 XP055196028, ISO/IEC 13818-1, pp. 93-102.

* cited by examiner

FAST CHANNEL CHANGE

CROSS-REFERENCE TO RELATED APPLICATIONS

This patent application is a continuation of, and claims priority to, U.S. application Ser. No. 10/926,374, entitled "FAST CHANNEL CHANGE," and filed Aug. 25, 2004, and which claims the benefit of U.S. Provisional Application No. 60/556,667 filed Mar. 26, 2004, the contents of all of which are hereby incorporated herein by reference in their entirety.

BACKGROUND OF THE INVENTION

In various digital video systems, there is a latency time between when a user makes a request for particular video information and when the system presents the requested video information to the user. For example and without limitation, a user may specify a viewing channel corresponding to video information that the user is interested in viewing. Further for example, a user may select a video information title from a menu, a user may enter a channel up/down request, or a user may sequence through a list of favorite video channels.

There will generally be a latency time between when the user requests video information and when the system presents the requested video information to the user. There may be any of a large variety of causes for such latency. Such causes may comprise, without limitation, request processing delays, information communication delays and information processing delays. In general, users prefer that the latency time between a video information request and presentation of the requested video information to the user be minimized.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method that provide reduced latency in a video signal processing system. Various aspects of the present invention may comprise generating and receiving a request for a unit of video information. For example a user may request a unit of video information corresponding to a channel change, an explicit channel, a trick play, a program listing on a menu, etc. A video receiver may, for example, receive such a request from a user and communicate a corresponding request for the unit of video information to a source of the unit of video information (e.g., a video transmission system).

A video transmission system may, for example, receive the request for the unit of video information and communicate the unit of video information to a video receiver. The video transmission system may, for example and without limitation, comprise a television communication system. For example, the video transmission system may transmit a first portion of the requested unit of video information to the video receiver for a first time period at a first transmission rate that is faster than a typical steady-state transmission rate for the unit of video information.

The first transmission rate may, for example, be predetermined or may be determined in real time (e.g., as a function of current video communication system conditions). For example and without limitation, the video transmission system may determine at least one of the first transmission rate and the first time period based, at least in part, on buffer characteristics of the video receiver or available communication bandwidth.

In transmitting at least one of the first and second portions of the unit of video information, the video transmission system may, for example, manage time reference information in the first portion of the unit of video information in accordance with the first transmission rate. Such time reference management may, for example and without limitation, comprise inserting and/or modifying program time reference information in the first portion of the unit of video information.

The video transmission system may transmit a second portion of the unit of video information at the typical steady-state transmission rate for the unit of video information. Such a typical steady-state transmission rate may, for example, be characterized as a rate of transmission that is normally used to transmit the video data to receivers that are processing the video data and presenting the decompressed video information to users. The typical steady state transmission rate may vary with time and may not be constant.

A video receiver may then, for example, receive the first and second portions of the unit of video information at respective reception rates corresponding to the respective transmission rates for the first and second portions of the unit of video information transmitted from the video transmission system. The video receiver may, for example, process the received first and second portions of the video information to present the unit of video information to a user in human-perceivable form.

These and other advantages, aspects and novel features of the present invention, as well as details of illustrative aspects thereof, will be more fully understood from the following description and drawings.

DETAILED DESCRIPTION OF THE INVENTION

Figure 1:
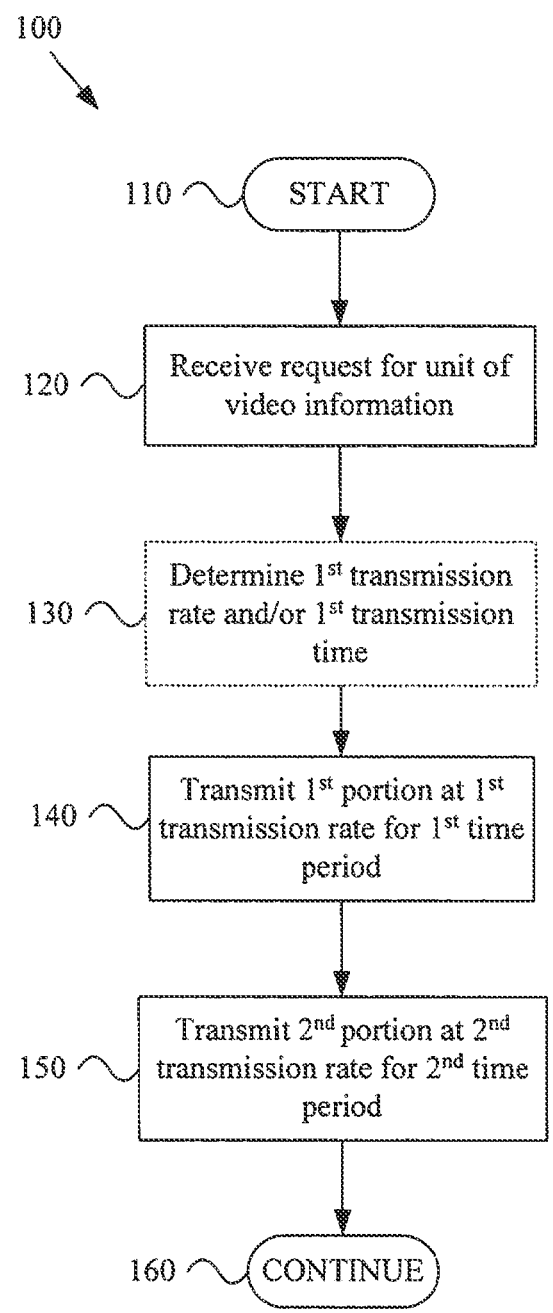
FIG. 1 is a flow diagram illustrating an exemplary method for providing reduced latency in a video transmission system, in accordance with various aspects of the present invention.

FIG. 1 is a flow diagram illustrating an exemplary method 100 for providing reduced latency in a video transmission system, in accordance with various aspects of the present invention. The exemplary method 100 may begin at step 110 in response to any of a large variety of causes and conditions. For example and without limitation, in an exemplary video signal-processing scenario, the method 100 may begin when a television receiver is powered up or turned on. Alternatively, for example, the method 100 may begin in response to an explicit user command to begin or an explicit user request for particular video information. Accordingly, the scope of various aspects of the present invention should not be limited by characteristics of any particular initiating events or conditions.

The exemplary method 100 may, at step 120, comprise receiving a request from a user (or other source) for a unit of video information. A unit of video information may, for example and without limitation, comprise a video program on another channel, a different (e.g., faster or reverse time) version of a video program, a music video or movie selected from a menu, etc. The scope of various aspects of the present invention should not be limited by characteristics of a particular unit of video information.

A request for a unit of video information may comprise any of a large variety of video information request characteristics. For example and without limitation, such a request may comprise a video program identification, a video channel identification, a menu indication, a channel change indication, a request to view a program on a next, previous or last channel, a request to view a program on a sequential list of channels (e.g., a list of favorite or genre channels), etc.

Further for example, a user may originate such a request in any of a large variety of ways. For example, a user may originate such a request using various user interface devices. For example and without limitation, a user may originate such a request using a television or video receiver remote control, pushbuttons on a television or video receiver, a graphical user interface, a keyboard, etc.

In an exemplary scenario, where a user originates such a request at a site remote from the source of the requested information, the request may be communicated to the source of the requested video information. Such communication may, for example, occur using any of a large variety of communication networks, media or protocols.

In general, step 120 may comprise receiving a request from a user (or other source) for a unit of video information. Accordingly, the scope of various aspects of the present invention should not be limited by characteristics of a particular type of request, way of communicating such a request or way of receiving such a request.

As will be discussed below, the exemplary method 100, at step 140, may comprise transmitting a first portion of the unit of video information at a first transmission rate (e.g., for a first time period). The exemplary method 100, at step 130, may comprise determining the first transmission rate and/or the first time period.

Step 130 may comprise determining the first transmission rate and/or the first time period using any of a large variety of criteria. For example, step 130 may comprise determining the first transmission rate based on available communication bandwidth between the source of the unit of video information and a receiver of the unit of video information. For example, in an exemplary scenario where there is relatively little available communication bandwidth over which video information may be communicated, step 130 may determine a relatively low first transmission rate for the video information. Such a relatively low first transmission rate may, however, still be higher than the typical steady-state transmission rate for the unit of video information. In an alternative exemplary scenario where there is a relatively large amount of available communication bandwidth, step 130 may determine a relatively high first transmission rate for the video information.

Step 130 may, for example, comprise determining the first transmission rate based on criteria other than, or in addition to, available communication bandwidth. For example and without limitation, step 130 may comprise determining the first transmission rate based on video data availability, desired quality of service, receiver priority, user priority, program priority, communication link conditions, time of day, day of the week, available energy supply, etc. In general, step 130 may comprise determining the first transmission rate. Accordingly, the scope of various aspects of the present invention should not be limited by characteristics of a particular way of determining the first transmission rate.

It should be noted that the first transmission rate may be pre-determined or may be determined in real-time (e.g., in response to real-time communication conditions). The first transmission rate may, for example, remain constant or may change dynamically (e.g., in response to changing communication conditions or needs). Accordingly, the scope of various aspects of the present invention should not be limited by the timing of the first transmission rate determination or whether the determined first transmission rate is static or dynamic.

As mentioned previously, step 130 may also comprise determining a first time period for which at least a portion of the requested unit of video information may be transmitted at the first transmission rate. Step 130 may comprise making such a determination using any of a large variety of criteria. For example and without limitation, step 130 may comprise determining the first time period based on the first transmission rate and on receiver buffer characteristics. Such receiver buffer characteristics may comprise the amount of buffer space in a receiver of the transmitted video information. Such receiver buffer characteristics (e.g., amount of buffer space) may, for example, be known or estimated. For example, an amount of buffer space in a receiver may be based, at least in part, on an amount of buffer space in a model that represents a receiver of the transmitted video information. For example, a receiver of the transmitted video information may have a known or estimated buffer space to fill before the receiver begins processing (e.g., decoding) the received video information for presentation of the received video information to a user. Step 130 may, for example, determine such an amount of video data needed by the receiver, and determine the first time period based on the time it will take to provide the receiver with the determined amount of video data at the first transmission rate.

Alternatively, for example, step 130 may comprise determining the first time period based on a predetermined latency goal. In an exemplary scenario, step 130 may comprise initially determining the first time period based on a predetermined latency goal, and then determining the first transmission rate based at least in part on the determined first time period and amount of video data to transmit.

As with the first transmission rate discussed previously, it should be noted that the first time period may be pre-determined or may be determined in real-time (e.g., in response to real-time communication conditions or needs). The first time period may, for example, remain constant or may change dynamically (e.g., in response to changing communication conditions or needs). Accordingly, the scope of various aspects of the present invention should not be limited by the timing of the first time period determination or whether the determined first time period is static or dynamic.

Note that the first time period determination is by no means essential. For example and without limitation, a video information communication may operate on a closed-loop basis, where a receiver of the video information and a source of the video information communicate regarding providing a particular initial amount of video information to the receiver. Accordingly, the scope of various aspects of the present invention should by no means be limited by characteristics of a particular first time period determination or by the existence or absence of such a determination.

As mentioned previously, the exemplary method 100, at step 140, may comprise transmitting a first portion of the unit of video information (e.g., corresponding to the unit of video information requested at step 120) at a first transmission rate (e.g., as determined at step 130) that is faster than a typical steady-state transmission rate for the unit of video information. This first transmission rate may be a variable rate.

The typical steady-state transmission rate for the unit of video information may, for example, be generally described as the rate at which the unit of video information is typically transmitted to a receiver such that the receiver may present the decoded video information to a user. For example, if the unit of video information is generally processed and presented to a user at a rate of N Mbps, then the typical steady-state transmission rate for the unit of video information may be generally similar to N Mbps. Of course, varying conditions (e.g., communication network conditions, receiver conditions and video presentation needs) may cause the typical steady-state transmission rate to vary somewhat. The typical steady state transmission rate may itself be a variable rate. As a non-limiting example, variable bit rate video transmission may be utilized in digital satellite television systems and digital cable television systems.

The exemplary step 140 may, for example and without limitation, transmit the first portion of the unit of video information at the first transmission rate for the first time period. As discussed previously, the first time period may be determined in an open loop or closed loop fashion. The first time period may be static or dynamic.

In an exemplary open-loop scenario, where step 130 determined a static first time period, step 140 may comprise transmitting a first portion of the unit of video information at the first transmission rate for the first time period. In an alternative exemplary open-loop scenario, where step 130 is omitted and the first time period is not determined explicitly, step 140 may comprise transmitting a first portion of the unit of video information at a first transmission rate, which may be a variable rate, until the first portion has been transmitted. In an alternative exemplary closed-loop scenario, where the first time period is dynamic, step 140 may comprise transmitting a first portion of the unit of video information to the receiver at the first transmission rate until receiving an indication from the receiver that the receiver now desires to receive information at a transmission rate other than the first transmission rate (e.g., the typical steady-state transmission rate).

In another exemplary scenario, where step 130 determined a first time period, step 140 may comprise initially transmitting a first portion of the unit of video information at the first transmission rate, determining (e.g., in response to dynamic communication conditions) that a transmission rate other than the first transmission rate is more appropriate than transmitting at the first transmission rate, and transmitting a remainder of the first portion of the unit of video information at a transmission rate other than the first transmission rate.

Note that in transmitting the first portion of the unit of video information, step 140 may, for example and without limitation, comprise managing time reference information related to the first portion of the unit of information. For example, step 140 may create, insert or modify timing information related to the first portion of the unit of video information. Such timing information may, for example, be based on the first transmission rate. In an exemplary scenario comprising an MPEG Transport stream, step 140 may comprise modifying Program Clock Reference (PCR) information in accordance with the first transmission rate. Such modified timing information may, for example, aid receiving and/or reconstructing transmitted video information at the receiving end. Note, however, that the scope of various aspects should not be limited by a particular style or type of transport stream or by particular timing information.

In general, step 140 may comprise transmitting a first portion of the unit of video information at a first transmission rate that is faster than a typical steady-state transmission rate for the unit of video information. Accordingly, the scope of various aspects of the present invention should not be limited by characteristics of a particular transmission rate or time duration, or by whether the transmission rate is constant or variable, or by characteristics of particular events or conditions that may cause the exemplary method 100 to stop communicating the unit of video information at the first transmission rate.

The exemplary method 100, at step 150, may comprise (e.g., after transmitting the first portion of the unit of video information at step 140) transmitting a second portion of the unit of video information at the typical steady-state transmission rate for the unit of video information.

Step 150 may, for example, comprise transmitting the second portion of the unit of video information at the typical steady-state transmission rate for a second time period. As with the first time period, the second time period may be predetermined or may be determined in real-time (e.g., based on communication conditions or demands). For example and without limitation, the second time period may be based on user request characteristics (e.g., transmitting the second portion of the unit of video information at the typical steady-state transmission rate until the user requests a change or the transmission is complete). For example and without limitation, the typical steady-state transmission rate may be a constant rate or a variable rate. Accordingly, the scope of various aspects of the present invention should not be limited by whether the second time period is static or dynamic, or whether the typical steady-state transmission rate is constant or variable, or whether the second time period is predetermined or determined in real-time.

The exemplary method 100, at step 160, may comprise performing continued video information processing. For example and without limitation, as mentioned previously, a system implementing the exemplary method 100 may respond to changing communication conditions. In an exemplary scenario, where communication bandwidth availability has changed, the method 100 execution may flow back to step 130 for a re-determination of the first transmission rate. In another exemplary scenario, where a user generates a next request for a next unit of video information, the method 100 execution may flow back to step 120 for receiving the next request. In general, step 160 may comprise performing continued processing. Accordingly, the scope of various aspects of the present invention should not be limited by characteristics of particular continued processing.

Figure 2:
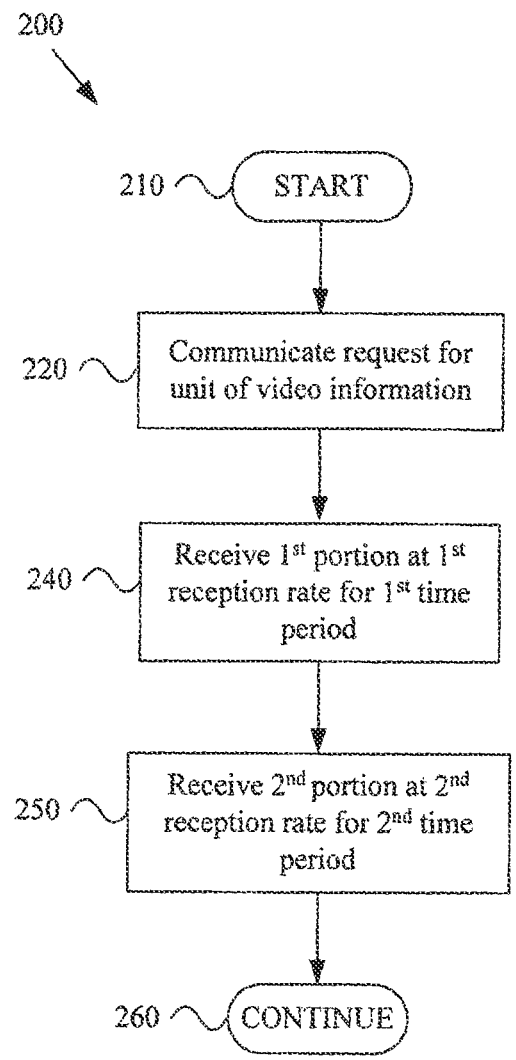
FIG. 2 is a flow diagram illustrating an exemplary method for providing reduced latency in a video reception system, in accordance with various aspects of the present invention.

FIG. 2 is a flow diagram illustrating an exemplary method 200 for providing reduced latency in a video reception system, in accordance with various aspects of the present invention. The exemplary method 200 may begin at step 210 in response to any of a large variety of causes and conditions. For example and without limitation, in an exemplary video signal-processing scenario, the method 200 may begin when a television receiver is powered up or turned on. Alternatively, for example, the method 200 may begin in response to an explicit user command to begin or an explicit user request for particular video information. Also for example, the method 200 may begin when requested video information begins to arrive at a video receiver. Accordingly, the scope of various aspects of the present invention should not be limited by characteristics of any particular initiating events or conditions.

The exemplary method 200 may, at step 220, comprise communicating a request to a video information source for a unit of video information. A unit of video information may, for example and without limitation, comprise a video program on another channel, a different (e.g., faster or reverse time) version of a video program, a music video or movie selected from a menu, etc. The scope of various aspects of the present invention should not be limited by characteristics of a particular unit of video information.

A request for a unit of video information may comprise any of a large variety of video information request characteristics. For example and without limitation, such a request may comprise a video program identification, a video channel identification, a menu indication, a channel change indication, a request to view a program on a next, previous or last channel, a request to view a video channel on a sequential list of channels (e.g., a list of favorite or genre channels), etc.

Further for example, a request for a unit of video information may originate from various sources. For example, a request may be generated automatically by a programmed apparatus. Also for example, a user may originate such a request. For example, a user may originate such a request using various user interface devices. For example and without limitation, a user may originate such a request using a television or video receiver remote control, pushbuttons on a television or video receiver, a graphical user interface, a keyboard, etc.

Step 220 may comprise communicating a request for a unit of video information to a video information source in any of a large variety of ways. For example, such communication may occur using any of a large variety of communication networks, media or protocols. For example and without limitation, step 220 may comprise communicating the request through a television network (e.g., a cable or satellite TV network). Step 220 may also, for example, comprise communicating the request through a computer network or telecommunications network. Step 220 may, for example, comprise communicating the request over any of a variety of communication media (e.g., wired, wireless, tethered optical, non-tethered optical, etc.).

In general, step 220 may comprise communicating a request for a unit of video information to a video information source. Accordingly, the scope of various aspects of the present invention should not be limited by characteristics of a particular type of request, origination of such a request, or way of communicating such a request.

The exemplary method 200, at step 240, may comprise receiving a first portion of the unit of video information at a first reception rate that is faster than a typical steady-state reception rate for the unit of video information. For example, step 240 may comprise receiving the first portion at the first reception rate for a first time period after communicating the request for the unit of video information at step 220. For example and without limitation, step 240 may comprise receiving a first portion of the unit of video information as may have been transmitted in accordance with the exemplary method 100 (e.g., step 140) illustrated in FIG. 1 and discussed previously.

The typical steady-state reception rate for the unit of video information may, for example, be generally described as the rate at which the unit of video information is typically received by a receiver for processing and presentation to a user. For example, if the unit of video information is typically received, processed and presented to a user at a rate of N Mbps, then the typical steady-state reception rate for the unit of video information may be generally similar to N Mbps. The typical steady-state reception rate may be a variable rate or it may be a constant rate. Of course, varying conditions (e.g., communication network conditions, receiver conditions and video presentation needs) may cause the typical steady-state reception rate to vary somewhat.

The typical steady-state reception rate may, for example, be related to the typical steady-state transmission rate discussed previously. For example, over time, the typical steady-state reception rate and the typical steady-state transmission rate might be the same. However, for example, depending on the communication link between a source of the unit of video information and a receiver of the unit of video information, at any particular point in time, the transmission rate and reception rate might not be exactly the same.

The first reception rate may, for example, be determined in any of a variety of ways, some of which were generally discussed previously with regard to the first transmission rate discussed with the exemplary method 100 (e.g., step 130) illustrated in FIG. 1. The first reception rate may, for example, be determined entirely by the source of the unit of video information or may, for example, be determined through negotiations between the source of the unit of video information and a receiver of such information. The first reception rate may also, for example, be determined by a receiver of the requested unit of video information based on the needs of the receiver. The first reception rate may also, for example, depend on current conditions of the communication network over which the unit of video information is being communicated. Accordingly, the scope of various aspects of the present invention should not be limited by characteristics of a particular first reception rate or way of determining such a reception rate.

The first time period may also, for example, be determined in any of a variety of ways, some of which were generally discussed previously with regard to the exemplary method 100 (e.g., step 130) illustrated in FIG. 1. For example, the first time period may be determined by the video information source, by the video information destination, or through negotiations between the video information source and destination. The first time period may, for example, be predetermined or may be determined in real-time. Also, for example, the first time period may be static or may be dynamic (e.g., changing with regard to varying communication conditions and/or needs). Accordingly, the scope of various aspects of the present invention should not be limited by characteristics of a particular first time period or way of determining the first time period.

Step 240 may comprise receiving the first portion of the unit of video information in any of a large variety of manners. For example and without limitation, step 240 may comprise receiving the first portion of the unit of video information through a television network. Step 240 may also, for example, comprise receiving the first portion of the unit of video information through a computer network or a telecommunications network.

Step 240 may, for example, comprise receiving the first portion of the unit of video information over various communication media (e.g., wired, RF, optical, etc.) using various video communication protocols. Accordingly, the scope of various aspects of the present invention should not be limited by characteristics of a particular video communication network, media or protocol.

The exemplary method 200, at step 250, may comprise receiving a second portion of the unit of video information at a typical steady-state reception rate for the unit of video information. For example, step 250 may comprise receiving the second portion at the typical steady-state reception rate for a second time period after receiving the first portion of the unit of video information at step 240. For example and without limitation, step 250 may comprise receiving a second portion of the unit of video information as may have been transmitted in accordance with the exemplary method 100 (e.g., step 150) illustrated in FIG. 1 and discussed previously.

As with the first time period, the second time period may be predetermined or may be determined in real-time (e.g., based on communication conditions or demands). For example and without limitation, the second time period may be based on user request characteristics (e.g., receiving the second portion of the unit of video information at the typical steady-state reception rate until the user requests a change or the reception is complete). Accordingly, the scope of various aspects of the present invention should not be limited by whether the second time period is static or dynamic, or whether the second time period is predetermined or determined in real-time.

As discussed previously with regard to the exemplary video transmission method 100 illustrated in FIG. 1, a first portion of the unit of video information and a second portion of the unit of video information may be transmitted with respective, and different, time reference information. Such time reference information for the first portion of the unit of video information may, for example, be based on the first transmission rate of the first portion of the unit of video information. Similarly, such time reference information for the second portion of the unit of video information may be based on the typical steady-state transmission rate for the unit of video information. In receiving first and second portions of such video information, steps 240 and 250 may comprise receiving and processing such respective time reference information for the first and second portions of the unit of video information. Such time reference information may then, for example, be utilized in processing the received unit of video information for presentation to a user.

The exemplary method 200, at step 260, may comprise performing continued video information processing. For example and without limitation, as mentioned previously, a system implementing the exemplary method 200 may respond to changing communication conditions. In an exemplary scenario, where communication conditions (e.g., video information transmission rate) have changed, the method 200 may receive and/or process video information at a communication rate other than the first transmission rate and the typical steady-state transmission rate). In another exemplary scenario, where a user originates a next request for a next unit of video information, the method 200 execution may flow back to step 220 for communicating the next request to a source of the next unit of video information.

Further for example, step 260 may comprise presenting the first portion of the unit of video information and the second portion of the unit of video information to a user. Such presentation may, for example and without limitation, comprise decoding the first and second portions, generating display driver signals representative of the first and second portions, and/or driving a video display device with the generated display driver signals.

For example and without limitation, step 260 may comprise presenting the first portion of the unit of video information and the second portion of the unit of video information to a user at a typical steady-state presentation rate for the unit of video information. In other words, in the exemplary scenario, even though the first portion of the unit of video information and the second portion of the unit of video information might have been received at different respective reception rates, the received first and second portions information may be presented to a user at respective substantially similar or identical rates.

In general, step 260 may comprise performing continued processing. Accordingly, the scope of various aspects of the present invention should not be limited by characteristics of particular continued processing.

Figure 3:
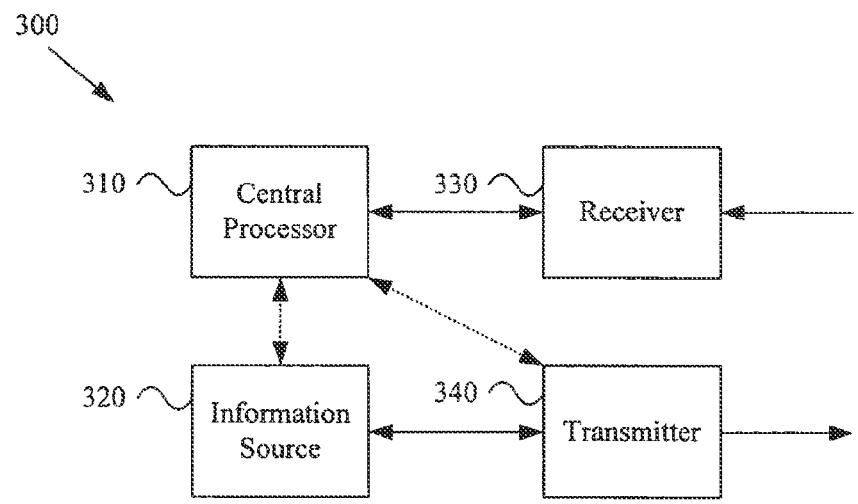
FIG. 3 is a diagram showing an exemplary video transmission system that provides reduced latency, in accordance with various aspects of the present invention.

FIG. 3 is a diagram showing an exemplary video transmission system 300 that provides reduced latency, in accordance with various aspects of the present invention. The exemplary system 300 may, for example and without limitation, perform various functionality of the exemplary method 100 illustrated in FIG. 1 and discussed previously. The exemplary system 300 may, for example, comprise any of a variety of video transmission systems. For example, the exemplary system 300 may comprise a cable or satellite television transmission system. The exemplary system 300 may, for example, comprise aspects of a video transmission system communicatively coupled to one or more video receivers through a computer network or telecommunication network. Accordingly, the scope of various aspects of the present invention should not be limited by characteristics of a particular video transmission system.

The exemplary video transmission system 300 may comprise a central processor 310 that, for example, controls general operation of the system 300. The central processor 310 may, for example and without limitation, comprise a processor executing software instructions. Alternatively, for example, the central processor 310 may comprise a computer system. Further, for example, the central processor 310 may comprise a programmable state machine. Additionally, for example, the exemplary video transmission system 300 may comprise a distributed system with no central processor. Accordingly, the scope of various aspects of the present invention should not be limited by characteristics of, or the existence of, a central processor.

The exemplary video transmission system 300 may comprise an information source 320. The information source 320 may, for example, store units of video information. Alternatively, for example, the information source 320 may comprise the ability to access other devices that store units of video information. For example and without limitation, the information source 320 may comprise a database of stored units of video information that is part of a television communication network. Such an exemplary database may store any of a variety of types of units of video information. In general, the exemplary video transmission system 300 may comprise an information source 320 that comprises or provides access to one or more units of video information. Accordingly, the scope of various aspects of the present invention should not be limited by characteristics of a particular type of information source.

Note that the information source 320 need not be geographically co-located with other portions of the exemplary video transmission system 300. For example and without limitation, the information source 320 may be communicatively coupled to various components of the exemplary system 300 through a communication network. Accordingly, the scope of various aspects of the present invention should not be limited by location of various components of the exemplary system 300.

The exemplary video transmission system 300 may comprise a receiver 330 that receives a request for a unit of video information. Such a requested unit of video information may, for example, be stored or accessible by the information source 320. The receiver 330 may, for example and without limitation, perform various aspects of the exemplary method 100 (e.g., step 120) illustrated in FIG. 1 and discussed previously.

For example, the exemplary receiver 330 may receive a request from a user or other source for a unit of video information. A unit of video information may, for example and without limitation, comprise a video program on another channel, a different (e.g., faster or reverse time) version of a video program, a music video or movie selected from a menu, etc. The scope of various aspects of the present invention should not be limited by characteristics of a particular unit of video information.

A request for a unit of video information may comprise any of a large variety of video request characteristics. For example and without limitation, such a request may comprise a video program identification, a video channel identification, a menu indication, a channel change indication, a request to view a program on a next, previous or last channel, a request to view a program on a sequential list of channels (e.g., a list of favorite or genre channels), etc.

Further for example, a user or other source may communicate such a request to the receiver 330 in any of a large variety of ways. For example, a user may communicate such a request using various user interface devices. For example and without limitation, a user may communicate such a request using a television or video receiver remote control, pushbuttons on a television or video receiver, a graphical user interface, a keyboard, etc.

In an exemplary scenario, where a user makes such a request at a site remote from the video transmission system 300, the request may be communicated to the receiver 330 (e.g., using any of a large variety of communication networks, media or protocols).

In general, the receiver 330 may receive a request from a user or other source for a unit of video information. Accordingly, the scope of various aspects of the present invention should not be limited by characteristics of a particular type of request, way of communicating such a request, way of receiving such a request, or apparatus for receiving such a request.

The exemplary video transmission system 300 may comprise a transmitter 340 that, for example, transmits a first portion of the unit of video information at a first transmission rate that is faster than the typical steady-state transmission rate for the unit of video information. The exemplary transmitter 340 may also, for example, transmit a second portion of the unit of video information at the typical steady-state transmission rate for the unit of video information. For example and without limitation, the exemplary transmitter 340 may perform various functionality of the exemplary method 100 (e.g., steps 130-150) illustrated in FIG. 1 and discussed previously.

As will be discussed in more detail below, the exemplary transmitter 340 may transmit a first portion of the requested unit of video information at a first transmission rate (e.g., for a first time period). The exemplary video transmission system 300 may determine the first transmission rate and/or the first time period. For example, the transmitter 340 may perform such a determination. Though the following discussion will generally discuss the transmitter 340 performing the determination, it should be noted that various other system 300 components (e.g., the central processor 310) may perform the determination. Accordingly, the scope of various aspects of the present invention should not be limited by any particular module or apparatus making the determination of the first transmission rate and/or the first time period.

The transmitter 340 may, for example, determine the first transmission rate and/or the first time period using any of a large variety of criteria. For example, the transmitter 340 may determine the first transmission rate based on available communication bandwidth between the video transmission system 300 and a receiver of the transmitted unit of video information. For example, in an exemplary scenario where there is relatively little available communication bandwidth over which video information may be communicated, the transmitter 340 may determine a relatively low first transmission rate for the video information. Such a relatively low first transmission rate may, however, still be higher than the typical steady-state transmission rate for the unit of video information. In an alternative exemplary scenario where there is a relatively large amount of available communication bandwidth, the transmitter 340 may determine a relatively high first transmission rate for the video information.

The transmitter 340 may, for example, determine the first transmission rate based on criteria other than, or in addition to, available communication bandwidth. For example and without limitation, the transmitter 340 may determine the first transmission rate based on video data availability, desired quality of service, receiver priority, user priority, program priority, communication link conditions, time of day, day of the week, available energy supply, etc. In general, the transmitter 340 may determine the first transmission rate. Accordingly, the scope of various aspects of the present invention should not be limited by characteristics of a particular way of determining the first transmission rate or particular apparatus for making such a determination.

It should be noted that the first transmission rate may be pre-determined or may be determined in real-time (e.g., in response to real-time communication conditions). The first transmission rate may, for example, remain constant or may change dynamically (e.g., in response to changing communication conditions or needs). Accordingly, the scope of various aspects of the present invention should not be limited by the timing of the first transmission rate determination or whether the determined first transmission rate is static or dynamic.

As mentioned previously, the transmitter 340 may also determine a first time period for which at least a portion of the requested unit of video information may be transmitted at the first transmission rate. The transmitter 340 may make such a determination using any of a large variety of criteria. For example and without limitation, the transmitter 340 may determine the first time period based on the first transmission rate and on receiver buffer characteristics. Such receiver buffer characteristics (e.g., amount of buffer space) may, for example be known or estimated. For example, an amount of buffer space in a receiver may be based, at least in part, on an amount of buffer space in a model that represents a receiver of the transmitted video information. For example, a receiver of the transmitted video information may have a known or estimated buffer space to fill before the receiver begins processing (e.g., decoding) the received video information for presentation of the received video information to a user. The transmitter 340 may, for example, determine such an amount of video data needed by the receiver, and determine the first time period based on the time it will take to provide the receiver with the determined amount of video data at the first transmission rate.

Alternatively, for example, the transmitter 340 may determine the first time period based on a predetermined latency goal. In an exemplary scenario, the transmitter 340 may initially determine the first time period based on a predetermined latency goal, and then determine the first transmission rate based, at least in part, on the determined first time period and amount of video data to transmit.

As with the first transmission rate discussed previously, it should be noted that the first time period may be pre-determined or may be determined in real-time (e.g., in response to real-time communication conditions or needs). The first time period may, for example, remain constant or may change dynamically (e.g., in response to changing communication conditions or needs). Accordingly, the scope of various aspects of the present invention should not be limited by the timing of the first time period determination or whether the determined first time period is static or dynamic.

Note that the first time period determination is by no means essential. For example and without limitation, a video information communication may operate on a closed-loop basis, where a receiver of the video information and the video transmission system 300 communicate regarding providing a particular initial amount of video information to the receiver. Alternatively, a video information communication may operate on a open-loop basis where the video transmission system may determine when a model of a hypothetical receiver has received sufficient video information to begin normal processing. Accordingly, the scope of various aspects of the present invention should by no means be limited by characteristics of a particular first time period determination or by the existence or absence of such a determination.

As mentioned previously, the transmitter 340 may transmit a first portion of the unit of video information (e.g., corresponding to the unit of video information requested in the request received by the exemplary receiver 330) at a first transmission rate that is faster than a typical steady-state transmission rate for the unit of video information. As discussed previously, the typical steady-state transmission rate for the unit of video information may, for example, be generally described as the rate at which the unit of video information is typically transmitted to a user.

The exemplary transmitter 340 may, for example and without limitation, transmit the first portion of the unit of video information at the first transmission rate for the first time period. As discussed previously, the first time period may be determined in an open loop or closed loop fashion. The first time period may be static or dynamic.

In an exemplary open-loop scenario, where the transmitter 340 (or, for example, the central processor 310) determined a static first time period, the transmitter 340 may transmit a first portion of the unit of video information at the first transmission rate for the first time period. In an alternative exemplary closed-loop scenario, where the first time period is dynamic, the transmitter 340 may transmit a first portion of the unit of video information to a receiver at the first transmission rate until the system 300 (e.g., the receiver 330) receives an indication from the receiver of the first unit of video information that the receiver now desires to receive information at a transmission rate other than the first transmission rate (e.g., the typical steady-state transmission rate).

In another exemplary scenario, where the transmitter 340 determined a first time period, the transmitter 340 may initially transmit a first portion of the unit of video information at the first transmission rate, determine (e.g., in response to dynamic communication conditions) that a transmission rate other than the first transmission rate is more appropriate than transmitting at the first transmission rate, and transmit a remainder of the first portion of the unit of video information at a transmission rate other than the first transmission rate.

Note that in transmitting the first portion of the unit of video information, the transmitter 340 may, for example and without limitation, manage time reference information related to the first portion of the unit of information. For example, the transmitter 340 may create, insert or modify timing information related to the first portion of the unit of video information. Such timing information may, for example, be based on the first transmission rate. In an exemplary scenario comprising an MPEG transport stream, the transmitter 340 may modify program clock reference information in accordance with the first transmission rate. Such modified timing information may, for example, aid receiving and/or reconstructing transmitted video information at the receiving end. Note, however, that the scope of various aspects should not be limited by a particular style or type of transport stream or by particular timing information.

In general, the transmitter 340 may transmit a first portion of the unit of video information at a first transmission rate that is faster than a typical steady-state transmission rate for the unit of video information. Accordingly, the scope of various aspects of the present invention should not be limited by a particular transmission rate or time duration, or by characteristics of particular events or conditions that may cause the transmitter 340 to stop communicating the unit of video information at the first transmission rate.

As mentioned previously, the exemplary transmitter 340 may transmit a second portion of the unit of video information at the typical steady-state transmission rate for the unit of video information.

The transmitter 340 may, for example, transmit the second portion of the unit of video information at the typical steady-state transmission rate for a second time period. As with the first time period, the transmitter 340 (or other component, such as the central processor 310) may determine the second time period in real-time, or the second time period may be predetermined. For example and without limitation, the transmitter 340 may determine the second time period based on user request characteristics (e.g., transmitting the second portion of the unit of video information at the typical steady-state transmission rate until the user requests a change or the transmission is complete). Accordingly, the scope of various aspects of the present invention should not be limited by whether the second time period is static or dynamic, or whether the second time period is predetermined or determined in real-time.

The exemplary video transmission system 300 may perform any of a large variety of additional video information processing. For example and without limitation, the exemplary system 300 may respond to changing communication conditions. In an exemplary scenario, where communication bandwidth availability has changed, the exemplary transmitter 340 (or other system 300 component) may re-determine the first transmission rate. In another exemplary scenario, where a user generates a next request for a next unit of video information, the exemplary receiver 330 may receive the next request, and the system 300 may then act on the received request. In general, the exemplary system 300 may perform any of a large variety of additional video information processing. Accordingly, the scope of various aspects of the present invention should not be limited by characteristics of particular additional processing.

Figure 4:
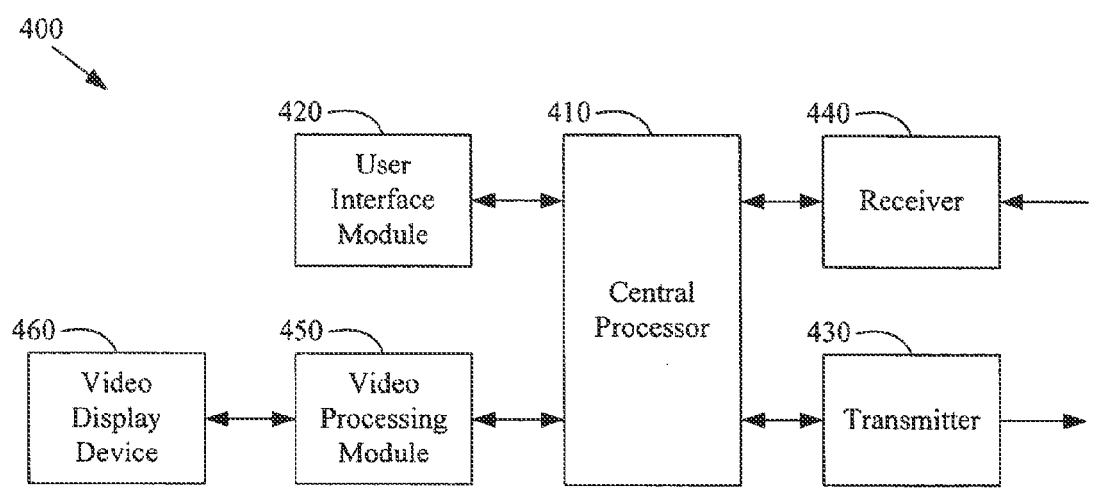
FIG. 4 is a diagram showing an exemplary video reception system that provides reduced latency, in accordance with various aspects of the present invention.

FIG. 4 is a diagram showing an exemplary video reception system 400 that provides reduced latency, in accordance with various aspects of the present invention. The exemplary system 400 may, for example and without limitation, perform various functionality of the exemplary method 200 illustrated in FIG. 2 and discussed previously.

The exemplary video reception system 400 may comprise characteristics of any of a large variety of video reception systems. For example and without limitation, the exemplary video reception system 400 may comprise a television receiver (e.g., a cable or satellite receiver). Also for example, the exemplary video reception system 400 may comprise apparatus to receive video information over a telecommunication or computer network. Accordingly, the scope of various aspects of the present invention should not be limited by characteristics of particular video receiving apparatus.

The exemplary video reception system 400 may comprise a central processor 410 that, for example, controls general operation of the system 400. The central processor 410 may, for example and without limitation, comprise a processor executing software instructions. Alternatively, for example, the central processor 410 may comprise a computer system. Further, for example, the central processor 410 may comprise a programmable state machine. Additionally, for example, the exemplary video reception system 400 may comprise a distributed system with no central processor. Accordingly, the scope of various aspects of the present invention should not be limited by characteristics of, or the existence of, a central processor.

The exemplary video reception system 400 may comprise a user interface module 420. The exemplary user interface module 420 may provide an interface between the video reception system 400 and a user. For example, the video reception system 400 may, through the user interface module 420, receive a request from a user for a unit of video information. As mentioned previously, such a request may take any of a large variety of forms. Also as mentioned previously, the unit of video information may take any of a variety of forms. Accordingly, the scope of various aspects of the present invention should not be limited by characteristics of particular video information requests or particular units of video information.

The user interface module 420 may comprise any of a large variety of user interface components and devices. For example and without limitation, the user interface module 420 may comprise a remote control receiver, a keyboard or keypad interface, a touch screen interface, a pushbutton interface, a voice recognition interface, a wired or wireless interface, an electrical, RF or optical interface, etc. Accordingly, the scope of various aspects of the present invention should not be limited by characteristics of particular user interface components or devices.

The exemplary video reception system 400 may comprise a transmitter 430 that communicates a request for a unit of video information to a video information source. The exemplary transmitter 430 may, for example and without limitation, perform various functionality of the exemplary method 200 (e.g., step 220) illustrated in FIG. 2 and discussed previously.

For example, the exemplary transmitter 430 may communicate a request to a video information source for a unit of video information. Such request for a unit of video information may comprise any of a large variety of video information request characteristics. For example and without limitation, such a request may comprise a video program identification, a video channel identification, a menu indication, a channel change identification, a request to view a program on a next, previous or last channel, a request to view a video channel on a sequential list of channels (e.g., a list of favorite or genre channels), etc.

Further for example, a request for a unit of video information may originate from various sources. For example, a request may be generated automatically by a programmed apparatus. Also for example, a user may originate such a request (e.g., using the user interface module 420 as discussed previously).

The exemplary transmitter 430 may communicate a request for a unit of video information to a video information source in any of a large variety of ways. For example, the transmitter 430 may utilize any of a large variety of communication networks, media or protocols. For example and without limitation, the transmitter 430 may communicate the request through a television network (e.g., a cable or satellite TV network). The transmitter 430 may also, for example, communicate the request through a computer network or telecommunication network. The transmitter 430 may, for example, communicate the request over any of a variety of communication media (e.g., wired, wireless, tethered optical, non-tethered optical, etc.).

In general, the transmitter 430 may communicate a request for a unit of video information to a video information source. Accordingly, the scope of various aspects of the present invention should not be limited by characteristics of a particular type of request, origination of such a request, way of communicating such a request, or apparatus for communicating such a request.

The exemplary video reception system 400 may comprise a receiver 440 that receives the requested unit of video information from the video information source. The exemplary receiver 440 may, for example and without limitation, perform various functionality of the exemplary method 200 (e.g., steps 240-250) illustrated in FIG. 2 and discussed previously. For example, the exemplary receiver 440 may, for a first time period, receive a first portion of the unit of video information at a first reception rate that is faster than a typical steady-state reception rate for the unit of video information. Also for example, the exemplary receiver 440 may, for a second time period after the first time period, receive a second portion of the unit of video information at a typical steady-state reception rate for the unit of video information.

As mentioned above, the exemplary receiver 440 may receive a first portion of the unit of video information at a first reception rate that is faster than a typical steady-state reception rate for the unit of video information. For example, the receiver 440 may receive the first portion at the first reception rate for a first time period after the transmitter 430, which was discussed previously, communicates the request for the unit of video information to a video information source. For example and without limitation, the receiver 440 may receive a first portion of the unit of video information as may have been transmitted in accordance with the exemplary method 100 (e.g., step 140) illustrated in FIG. 1 and discussed previously or as may be transmitted by the exemplary video transmission system 300 (e.g., transmitter 340) illustrated in FIG. 3 and discussed previously.

As mentioned previously, the typical steady-state reception rate for the unit of video information may, for example, be generally described as the rate at which the unit of video information is typically received by a receiver that processes the information for presentation to a user. Also, as mentioned previously, the typical steady-state reception rate for the unit of video information may be related to the typical steady-state transmission rate for the unit of video information, and this rate may be either a variable rate or a constant rate.

The first reception rate may, for example, be determined in any of a variety of ways, some of which were generally discussed previously with regard to the exemplary method 200 (e.g., step 240) illustrated in FIG. 2. The first reception rate may, for example, be determined entirely by the source of the unit of video information or may, for example, be determined through negotiations between the source of the unit of video information and the receiver 440 or another system entity. The first reception rate may also, for example, be determined by the receiver 440 based on the needs of the receiver 440. Accordingly, the scope of various aspects of the present invention should not be limited by characteristics of a particular first reception rate or way of determining such a reception rate.

The first time period may also, for example, be determined in any of a variety of ways, some of which were generally discussed previously with regard to the exemplary method 200 (e.g., step 240) illustrated in FIG. 2. For example, the first time period may be determined by the video information source, the video information destination, or through negotiations between the video information source and destination. The first time period may, for example, be predetermined or may be determined in real-time. Also, for example, the first time period may be static or may be dynamic (e.g., changing with regard to varying communication conditions and/or needs). Accordingly, the scope of various aspects of the present invention should not be limited by characteristics of a particular first time period or way of determining the first time period.

The exemplary receiver 440 may receive the first portion of the unit of video information in any of a large variety of manners. For example and without limitation, the receiver 440 may receive the first portion of the unit of video information through a television network. The exemplary receiver 440 may also, for example, receive the first portion of the unit of video information through a computer network or a telecommunication network. The receiver 440 may, for example, receive the first portion of the unit of video information over various communication media (e.g., wired, RF, optical, etc.) using various video communication protocols. Accordingly, the scope of various aspects of the present invention should not be limited by characteristics of a particular video communication network, media or protocol.

As mentioned previously, the exemplary receiver 440 may also receive a second portion of the unit of video information at a typical steady-state reception rate for the unit of video information. For example, the receiver 440 may receive the second portion at the typical steady-state reception rate for a second time period after receiving the first portion of the unit of video information as discussed previously. For example and without limitation, the receiver 440 may receive a second portion of the unit of video information as may have been transmitted in accordance with the exemplary method 100 (e.g., step 150) illustrated in FIG. 1 or by the exemplary video transmission system 300 (e.g., the transmitter 340) illustrated in FIG. 3 and discussed previously.

As with the first time period, the second time period may be predetermined or may be determined in real-time (e.g., based on communication conditions or demands). For example and without limitation, the second time period may be based on user request characteristics (e.g., receiving the second portion of the unit of video information at the typical steady-state reception rate until the user requests a change or the reception is complete). Accordingly, the scope of various aspects of the present invention should not be limited by whether the second time period is static or dynamic, or whether the second time period is predetermined or determined in real-time.

As discussed previously with regard to the exemplary video transmission system 300 illustrated in FIG. 3, a first portion of the unit of video information and a second portion of the unit of video information may be transmitted with respective, and different, time reference information. Such time reference information for the first portion of the unit of video information may, for example, be based on the first transmission rate of the first portion of the unit of video information. Similarly, such time reference information for the second portion of the unit of video information may be based on the typical steady-state transmission rate for the unit of video information. In receiving first and second portions of such video information, the receiver 440 may receive and/or process such respective time reference information for the first and second portions of the unit of video information. Such time reference information may then, for example, be utilized in processing the received unit of video information for presentation to a user.

The exemplary video reception system 400 may perform continued video information processing. For example and without limitation, as mentioned previously, the exemplary system 400 may respond to changing communication conditions. In an exemplary scenario, where communication conditions (e.g., video information communication rate) have changed, the system 400 may receive and/or process video information at a communication rate other than the first reception rate and the typical steady-state reception rate. In another exemplary scenario, where a user originates a next request for a next unit of video information, the exemplary system 400 (e.g., the transmitter 430) may communicate the next request to a source of the next unit of video information.

Also for example, the exemplary video reception system 400 may comprise a video processing module 450 that processes the received unit of video information for presentation to a user. The exemplary video processing module 450 may, for example, comprise a decoder that decodes the first portion and second portion of the unit of video information received by the receiver 440. The exemplary video processing module 450 may, for example, comprise a display driver that generates display driver signals representative of the first and second portions of the unit of video information.

The exemplary video reception system 400 may, for example, comprise a video display device 460 that receives a display driver signal and presents a corresponding human-perceivable image.

In an exemplary scenario, the video processing module 450 (e.g., in conjunction with the video display device 460) may present the first portion of the unit of video information and the second portion of the unit of video information to a user at a typical steady-state presentation rate for the unit of video information. In other words, in the exemplary scenario, even though the first portion of the unit of video information and the second portion of the unit of video information might have been received by the video reception system 400 at different respective reception rates, the video reception system 400 may present the received first and second portions of the unit of video information to a user at respective substantially similar or identical rates.

In general, the exemplary video reception system 400 may perform continued processing. Accordingly, the scope of various aspects of the present invention should not be limited by characteristics of particular continued processing.

The previous discussion described various exemplary system components, modules and sub-modules. The various components, modules and sub-modules may be implemented using hardware, software, or a combination thereof. For example and without limitation, any of the various components, modules and sub-modules may be independent circuits or may be integrated into a single integrated circuit. Accordingly, the scope of various aspects of the present invention should not be limited to characteristics of a particular hardware or software implementation.

In summary, various aspects of the present invention provide a system and method that provide reduced latency in a video signal processing system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the Therefore, at least the following is claimed:

1. A method, comprising:
receiving, by a video transmission system having one or more processors, a request for a unit of video information from a remote video receiver;
determining an initial transmission rate for the unit of video information using a real-time determination of available communication bandwidth between the video transmission system and the remote video receiver and a first steady-state transmission rate for the unit of video information, the initial transmission rate being higher than the first steady-state transmission rate;
for a first time period after receiving the request, transmitting, by the video transmission system, a first portion of the unit of video information to the remote video receiver at the initial transmission rate, wherein in response to a change in the available communication bandwidth between the video transmission system and the remote video receiver during the first time period, transmitting a remainder of the first portion of the unit of video information to the remote video receiver at a second transmission rate for a remainder of the first time period, the second transmission rate being determined using the change in the available communication bandwidth and being different from the initial transmission rate and the first steady-state transmission rate; and
for a second time period after the first time period, transmitting, by the video transmission system, a second portion of the unit of video information to the remote video receiver at the first steady-state transmission rate.

2. The method of claim 1,
wherein the request for the unit of video information comprises a channel change request; and
wherein the first steady-state transmission rate is a typical steady-state transmission rate, and wherein the typical steady-state transmission rate comprises a variable rate.

3. The method of claim 1, further comprising determining the initial transmission rate using a decoder model.

4. The method of claim 3, wherein the decoder model comprises a hypothetical reference decoder model.

5. The method of claim 3, wherein at least one of the initial transmission rate or the first time period are determined so as not to overflow an input buffer that is based at least in part on the decoder model.

6. The method of claim 1, further comprising modifying, by the video transmission system, program clock reference (PCR) information for the first portion of the unit of video information using the initial transmission rate, the PCR information being modified to convey a timing according to the initial transmission rate to a decoder in the remote video receiver when the first portion of the unit of video information is being transmitted at the initial transmission rate.

7. The method of claim 1, further comprising:
determining the first time period using a predetermined latency goal; and
determining the initial transmission rate for the unit of video information further using the determined first time period and an amount of video data to transmit.

8. A system, comprising:
a video transmission system comprising circuitry configured to:
receive a request for a unit of video information from a remote video receiver;
determine an initial transmission rate for the unit of video information using a real-time determination of available communication bandwidth between the video transmission system and the remote video receiver and a first steady-state transmission rate for the unit of video information, the initial transmission rate being higher than the first steady-state transmission rate;
for a first time period after receiving the request, transmit a first portion of the unit of video information to the remote video receiver at the initial transmission rate, wherein program clock reference (PCR) information for the first portion of the unit of video information is modified using the initial transmission rate, the PCR information being modified to convey a timing according to the initial transmission rate to a decoder in the remote video receiver when the first portion of the unit of video information is being transmitted at the initial transmission rate; and
for a second time period after the first time period, transmit a second portion of the unit of video information to the remote video receiver at the first steady-state transmission rate.

9. The system of claim 8, wherein the circuitry is further configured to determine the initial transmission rate using the unit of video information.

10. The system of claim 8,
wherein the request for the unit of video information comprises a channel change request, and
wherein the first steady-state transmission rate is a typical steady-state transmission rate, and wherein the typical steady-state transmission rate comprises a variable rate.

11. The system of claim 8, wherein the circuitry is further configured to determine the initial transmission rate and the first time period using a decoder model.

12. The system of claim 11, wherein the decoder model comprises a hypothetical reference decoder model.

13. The system of claim 11, wherein the initial transmission rate and the first time period are determined so as not to overflow an input buffer that is based at least in part on the decoder model.

14. The system of claim 8, wherein the circuitry is further configured to:
determine the first time period using a predetermined latency goal; and
determine the initial transmission rate for the unit of video information further using the determined first time period and an amount of video data to transmit.

15. The system of claim 8, wherein the circuitry is further configured to:
in response to a change in the available communication bandwidth between the video transmission system and the remote video receiver during the first time period, transmit a remainder of the first portion of the unit of video information to the remote video receiver at a second transmission rate for a remainder of the first time period,
wherein the second transmission rate is determined using the change in the available communication bandwidth and is different from the initial transmission rate and the first steady-state transmission rate.

16. A method, comprising:
sending a request for a unit of video information to a remote video transmitter;
for a first time period after sending the request, receiving a first portion of the unit of video information from the remote video transmitter at an initial transmission rate, the initial transmission rate being determined using a real-time determination of available communication bandwidth, and a first steady-state transmission rate for the unit of video information, wherein the initial transmission rate is higher than the first steady-state transmission rate, and the first portion of the unit of video information includes modified program clock reference (PCR) information, the modified PCR information being modified using the initial transmission rate; and for a second time period after the first time period, receiving a second portion of the unit of video information from the remote video transmitter at the first steady-state transmission rate.

17. The method of claim 16, wherein:

the request for the unit of video information comprises a channel change request; and the first steady-state transmission rate is a typical steady-state transmission rate.

18. The method of claim 16, further comprising:

determining the initial transmission rate and the first time period using a decoder model; and decoding the unit of video information using the decoder model, wherein the initial transmission rate and the first time period are determined so as not to overflow an input buffer that is based at least in part on the decoder model.

19. The method of claim 18, wherein the decoder model comprises a hypothetical reference decoder model.

20. The method of claim 16, further comprising:

determining the first time period using a predetermined latency goal; and determining the initial transmission rate for the unit of video information further using the determined first time period and an amount of video data to transmit.

* * * * *